(12) United States Patent
Lewbel

(10) Patent No.: US 9,760,241 B1
(45) Date of Patent: Sep. 12, 2017

(54) TACTILE INTERACTION WITH CONTENT

(75) Inventor: Hannah Rebecca Lewbel, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 12/940,936

(22) Filed: Nov. 5, 2010

(51) Int. Cl.
*G06F 3/041* (2006.01)
*G06F 3/0481* (2013.01)

(52) U.S. Cl.
CPC .......... *G06F 3/04812* (2013.01); *G06F 3/041* (2013.01)

(58) Field of Classification Search
USPC .......................................................... 345/173
See application file for complete search history.

(56) References Cited

U.S. PATENT DOCUMENTS

| | | | |
|---|---|---|---|
| 7,106,220 B2* | 9/2006 | Gourgey | G09B 21/005 341/27 |
| 8,780,060 B2 | 7/2014 | Maschmeyer et al. | |
| 2005/0024346 A1* | 2/2005 | Dupraz et al. | 345/179 |
| 2005/0122317 A1* | 6/2005 | Schaaf | B60K 35/00 345/173 |
| 2007/0298877 A1* | 12/2007 | Rosenberg | 463/30 |
| 2009/0085877 A1* | 4/2009 | Chang et al. | 345/173 |
| 2009/0085881 A1* | 4/2009 | Keam | 345/173 |
| 2009/0160793 A1* | 6/2009 | Rekimoto | G06F 3/0414 345/173 |
| 2009/0167704 A1* | 7/2009 | Terlizzi | G06F 3/016 345/173 |
| 2009/0225073 A1* | 9/2009 | Baker, III | G06T 17/05 345/419 |
| 2009/0227296 A1* | 9/2009 | Kim | G06F 3/016 455/566 |
| 2009/0251421 A1* | 10/2009 | Bloebaum | G06F 3/016 345/173 |
| 2009/0256814 A1* | 10/2009 | Chung et al. | 345/173 |
| 2010/0123686 A1* | 5/2010 | Klinghult | G06F 3/0412 345/178 |
| 2010/0156656 A1* | 6/2010 | Duarte et al. | 340/815.4 |
| 2010/0156818 A1* | 6/2010 | Burrough | G06F 3/016 345/173 |
| 2010/0283742 A1* | 11/2010 | Lam | G06F 3/04883 345/173 |
| 2010/0328053 A1* | 12/2010 | Yeh | G06F 3/041 340/407.2 |
| 2011/0043077 A1* | 2/2011 | Yeh et al. | 310/338 |
| 2011/0096087 A1* | 4/2011 | Chun | 345/592 |
| 2011/0128236 A1* | 6/2011 | Faubert | G06F 3/016 345/173 |

(Continued)

*Primary Examiner* — Lisa Landis
(74) *Attorney, Agent, or Firm* — Lee & Hayes, PLLC

(57) ABSTRACT

Some implementations provide tactile interaction to a user during consumption of content. For instance, when a user accesses a content item on an electronic device having a display, the user may touch the display at a location corresponding to a first feature in a displayed image to generate a first type of tactile output. Moving the user's finger to a location of a second feature of the image may result in a second type of tactile output, different from the first. Additionally, in some implementations, a force of a touch input may be determined, and the tactile output may vary based on the amount of force of the touch input. Further, in some implementations, the tactile output may vary based on a time duration of a touch input.

23 Claims, 14 Drawing Sheets

(56) References Cited

U.S. PATENT DOCUMENTS

| | | | |
|---|---|---|---|
| 2011/0221694 A1* | 9/2011 | Karaoguz et al. | 345/173 |
| 2011/0275412 A1* | 11/2011 | Khawand | G06F 3/04847 |
| | | | 455/566 |
| 2012/0050176 A1* | 3/2012 | Chin | 345/173 |
| 2012/0105367 A1* | 5/2012 | Son et al. | 345/174 |

* cited by examiner

TACTILE INTERACTION WITH CONTENT

BACKGROUND

More and more people are using electronic devices for entertainment through the consumption of digital media content items, such as images, movies, music, electronic books (eBooks), audio books, and so forth. Examples of these electronic devices may include eBook reader devices, cellular telephones, tablet computers, portable media players, netbooks, personal digital assistants (PDAs), and the like. However, user interfaces for such electronic devices traditionally engage a limited number of human senses. For example, users are able to view images presented on displays and hear sounds generated by speakers, but tactile or haptic output has typically been limited to simple shakes or buzzes. As digital content continues to increase in popularity, and electronic devices for consuming that digital content become more ubiquitous, providing ways to enhance the user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Tactile Interaction

Figure 1:
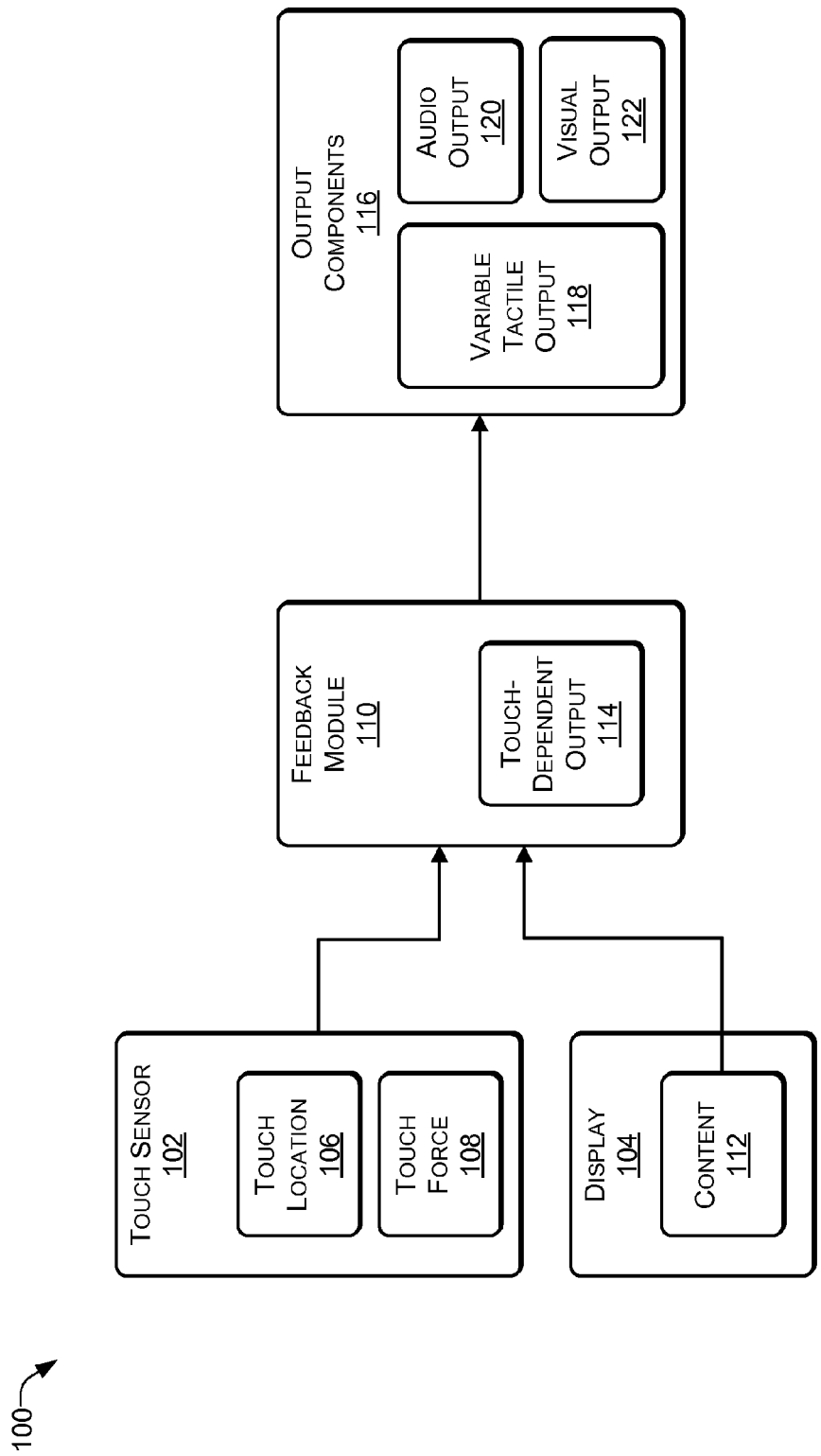
FIG. 1 is a block diagram of a framework for user interaction with content according to some implementations.

This disclosure describes techniques for enabling a user to interact with content on an electronic device. In some implementations, tactile output or feedback may be provided for enabling a user to interact physically with content on an electronic device. In some implementations, the level of tactile output provided may vary depending on a location on the electronic device that a user touches, such as different locations on a touch-sensitive display. For instance, when a user touches the display, the electronic device may provide tactile output of different types, such as different intensities, based on a location of the user's finger relative to one or more features or contours of a displayed image.

In some implementations, as a user slides a finger along the display surface, from one location to the next, the intensity of the tactile output may vary, and the variation in the intensity may be in correlation with an image currently rendered on the display. For example, if the image displays contours or features of different heights, the higher contours or features may be associated with a different type of tactile output than the lower contours or features. Consequently, in some implementations, a user may feel contours or shapes in a displayed image based on varying intensities of the tactile output. Additionally, in various implementations, the device may output sound and/or visual feedback that may also vary with a touch input location and/or movement of a user's finger.

In some implementations, the haptic or tactile output may also vary according to an amount of force applied by a user to a touch sensor associated with the display. For example, when the user touches the touch sensor using a first amount of force, a first type or level of tactile output may be provided. When the user touches the touch sensor using a second amount of force, a different type or level of tactile output may be provided. In some implementations, these different output types based on detected force may also include variations in sound or visual feedback provided to the user. Thus, a user may touch a feature in a displayed image with a first level of force and the feature may become animated or change appearance. Additionally, the electronic device may produce a sound related to the feature and provide tactile output, such as a localized vibration of a first intensity. If the user touches the feature with a different level of force, the feature may be animated in a different manner, a different sound may be produced, and tactile output of a different level of intensity may be generated.

Haptic or tactile output provided by most electronic devices has been limited. Traditional haptic output components provide coarse haptic output such as buzzes or vibrations. For example, a typical haptic output component may consist of a vibrator with a rotary motor coupled to an eccentric weight that, when spun, generates a vibration. On the other hand, according to some implementations herein, the tactile output may be provided by one or more tactile output components. In some implementations, the tactile output is provided in a localized manner, such as at a location on a display that a user's finger is touching. For example, a plurality of haptic actuators may be located in contact with the display for providing a localized vibration or other physical feedback of a controllable intensity. Thus, some implementations may incorporate a variety of near-surface-located piezoelectric actuators for providing tactile output at a location that the user is touching.

In other implementations, an electrical stimulus may serve as the tactile output. For example, an electrically conductive grid may be provided on the surface of the display for delivering different levels of mild electrical stimulus based on a location on the display that the user is touching. Accordingly, some implementations may provide localized tactile output at various different levels of intensity for enhancing interaction of a user with content displayed or played by the electronic device.

This disclosure also describes a framework, architecture and techniques for providing tactile output and interaction to a user. For instance, when a user views a map or reads an eBook, the techniques herein may be applied to enable tactile recognition of various displayed features. In one example, the techniques may be applied to provide an electronic emulation of a pop-up-type book by providing a combination of tactile, audio and visual interaction to a user. In another example, the techniques herein may be applied for providing a raised-content experience to a user, such as for reading and physically interacting with maps and other images having varying topologies, contours, steps, levels of different heights, and the like.

In some implementations, the content items may include metadata for specifying tactile output to be provided when the content item is consumed on the electronic device. For example, in the case of an eBook, the publisher may specify tactile output to be generated in association with one or more images contained in the eBook. In other implementations, for some types of content items, a recognition technology may be used by the electronic device for determining appropriate tactile output levels. For example, in the case of a map, the electronic device may recognize different elevations represented, and automatically provide varying levels of tactile output based on the differences in elevation. Similarly, in the case of a digital photograph, the electronic device may distinguish foreground objects from background objects. For example, when a user touches the foreground objects, a higher level of intensity of tactile output may be generated than when the user touches the background portion of the image. In addition, some implementations may include additional user interaction with content items, such as incorporating a user-generated image into a content item to further engage the user with the content item. For example, the user may specify tactile output for portions of the image, or the electronic device may specify tactile outputs automatically.

The techniques described herein may be applied in connection with both two-dimensional (2D) and three-dimensional (3D) display technology. For instance, the in the case of a 2D display, the techniques herein can provide a tactile 3D effect to aid in viewing the 2D image. Additionally, in the case of a 3D display, the techniques herein can vary tactile sensations in correlation with a displayed 3D image for enhancing user interaction with the 3D image.

The techniques described herein may apply to a variety of different types of content items, such as maps, eBooks, still images, videos, audio books, music, and so on. Furthermore, the techniques may apply to a variety of different electronic devices, such as eBook reader devices, navigation devices, personal computers, cellular telephones, personal digital assistants (PDAs), portable media players, tablet computers, netbooks, cash registers, and the like.

The foregoing discussion is provided for the reader's convenience and is not intended to limit the scope of the claims or the disclosure herein. Furthermore, the techniques described above and below may be implemented in a number of ways and in a number of contexts. Several example implementations and contexts are provided with reference to the figures, as described below in more detail. However, the following implementations and contexts are but a few of many.

Example Framework

FIG. 1 is a block diagram of an example framework 100 for providing interactive and variable tactile output according to some implementations. Framework 100 includes a touch-sensor 102 and a display 104. In some implementations, touch sensor 102 and display 104 may be combined in a single unit as a touch-sensitive display. However, in other implementations, the touch sensor 102 may be separate from at least a portion of the display 104. The touch sensor 102 may identify at least one of a touch location 106 or a touch force 108 and provide this information to a feedback module 110.

Feedback module 110 assesses content 112 currently being rendered on display 104 in conjunction with the touch location 106 and/or touch force 108 received from the touch sensor for determining a touch-dependent output 114. For example, in some implementations, the content 112 may include metadata that specifies a particular tactile output to be provided based on one or more of touch location 106 or touch force 108 at a location of a particular displayed feature. In other implementations, the feedback module 110 may use a recognition process for determining a suitable output for a particular feature of the displayed content based on the input from the touch sensor 102. For example, the feedback module 110 may correlate the detected touch location 106 with the location of a feature of the displayed content, determine which feature was touched by the user's touch input, and determine the touch-dependent output 114 to be provided at the location that the user is touching.

Feedback module 110, upon determining the touch-dependent output 114, may activate or may provide instructions for activating one or more output components 116. For example, output components 116 may provide a variable tactile output 118, an audio output 120, and/or a visual output 122. As mentioned above, the variable tactile output 118 may vary, such as varying the intensity of the tactile output based on the touch location 106 and/or the touch force 108. Furthermore, based on the detected touch location 106 or touch force 108, various different audio and/or visual outputs may also be provided. The framework 100 is one example of a framework for some implementations herein, and is not intended to limit the implementations herein, which may also be applied under other frameworks, architectures, and the like.

Example Electronic Device

Figure 2:
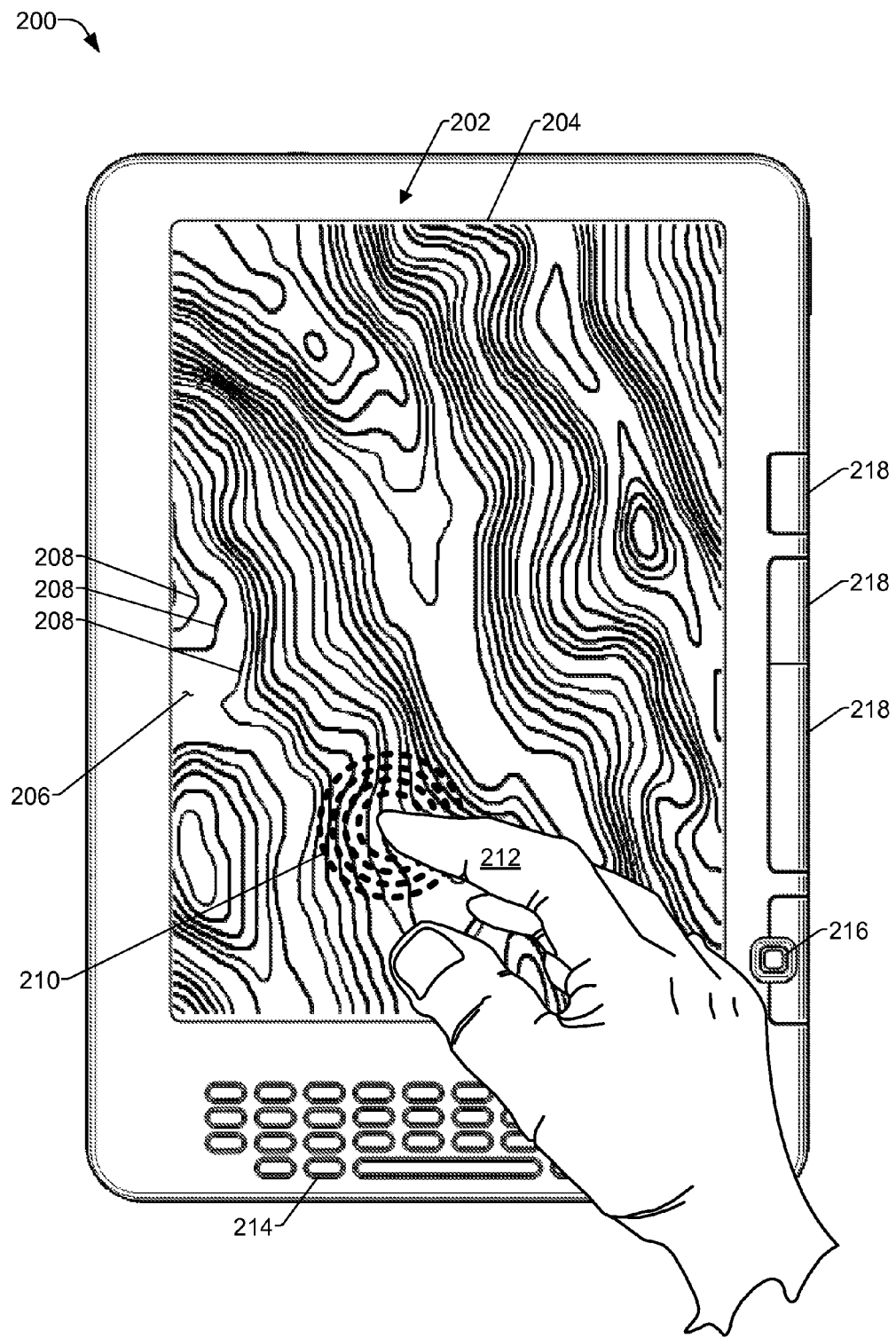
FIG. 2 is an example of an electronic device able to provide tactile interaction with content according to some implementations.

FIG. 2 depicts an example of an electronic device 200 for providing tactile interaction according to some implementations. Examples of electronic device 200 may include eBook readers, cellular phones, portable media players, navigation devices, tablet computers, personal computers, netbooks, laptops, cash registers, kiosks, touch screens, and so forth. In some implementations, the electronic device 200 may, but need not necessarily, implement the framework 100 of FIG. 1 described above.

The electronic device 200 includes a display 202 configured to present information to a user and a touch sensor 204 for receiving user touch input. In some implementations, the touch sensor 204 may be adjacent to or integrated with the display 202 to form a touchscreen. For example, display 202 may display a content item 206, which in the illustrated example is a topographic image, such as a map. For example, content item 206 may include lines 208, or the like, that represent variations in known properties of the content item. Thus, in the case of a topographic map, the lines 208 may be contour lines that represent variations in elevation of the features represented in the map. As another example, in the case of a weather map, the lines may be isobars representing variations in temperature. Numerous other types of topographic images may be displayed, with the foregoing being just several examples. Further, the techniques herein may be applied to other types of images, videos, and so forth that do not include displayed lines or topology. For example, an image that includes a hierarchical representation may be represented having varying tactile output from one hierarchical level to the next. As another example, an image of a face may include variations in tactile output as a user moves a finger from the ears, to a cheek, eyes, nose, mouth, etc. Thus, implementations herein are not limited to use with a particular type of image.

Tactile output 210 is represented by broken lines and may be produced using various types of tactile output components, as described additionally below. For example, a user may touch a finger 212 or other body part to the touch sensor 204, and the electronic device may produce tactile output 210 felt by the finger 212 at the location of the touch input. In some implementations, to produce the tactile output, the electronic device 200 may include haptic output and feedback components, as described below with reference to FIGS. 3 and 4A-4B. For example, some implementations of electronic device 200 may include integrated haptic actuators. In other implementations, the tactile output may be provided as an inductive stimulus or other low-level electrical feedback to the user's finger 212. Other techniques for delivering localized tactile output are also contemplated, as will be apparent to those of skill in the art in view of the disclosure herein.

In some implementations, the tactile output 210 may provide a varying level of tactile feedback based on a location on the touch sensor 204 that the user's finger 212 is touching. For example, as the user's finger moves over the surface of the touch sensor 204, from one portion of image 206 to another, the user's finger 212 may cross over one or more of lines 208. As the user's finger is detected crossing each line 208, the level of intensity of the tactile output may increase or decrease. For instance, in the example of an elevation map, the tactile output may increase in intensity as a user's finger moves from a lower elevation to a higher elevation. Similarly, in the case of a temperature map, the tactile output may increase as the user's finger moves from a lower temperature to a higher temperature, or vice versa. As another example, in the case of an image having foreground portions and background portions, moving the user's finger from a background portion to a foreground portion may produce a change in the level of tactile output provided.

The electronic device 200 may be configured with functionality to enable consumption of one or more content items of numerous different types or formats including, for example, electronic maps, electronic texts (e.g., documents of any format, electronic periodicals, such as digital magazines and newspapers, etc.), digital audio (e.g., music, audible books, etc.), digital video (e.g., movies, television, short clips, etc.), images (e.g., art, photographs, etc.), and multi-media content. In some implementations, the content presented on the display 202 may take the form of electronic books or "eBooks." For example, the display 202 may depict the text of the eBooks and also any illustrations, tables, maps, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The electronic device 200 may further include various external controls and input devices in addition to touch sensor 204. For example, some implementations of electronic device 200 may include a virtual or physical keyboard 214, a pointing stick, touchpad, trackball or joystick type mechanism 216, and various other controls 218 for performing various desired functions.

Figure 3:
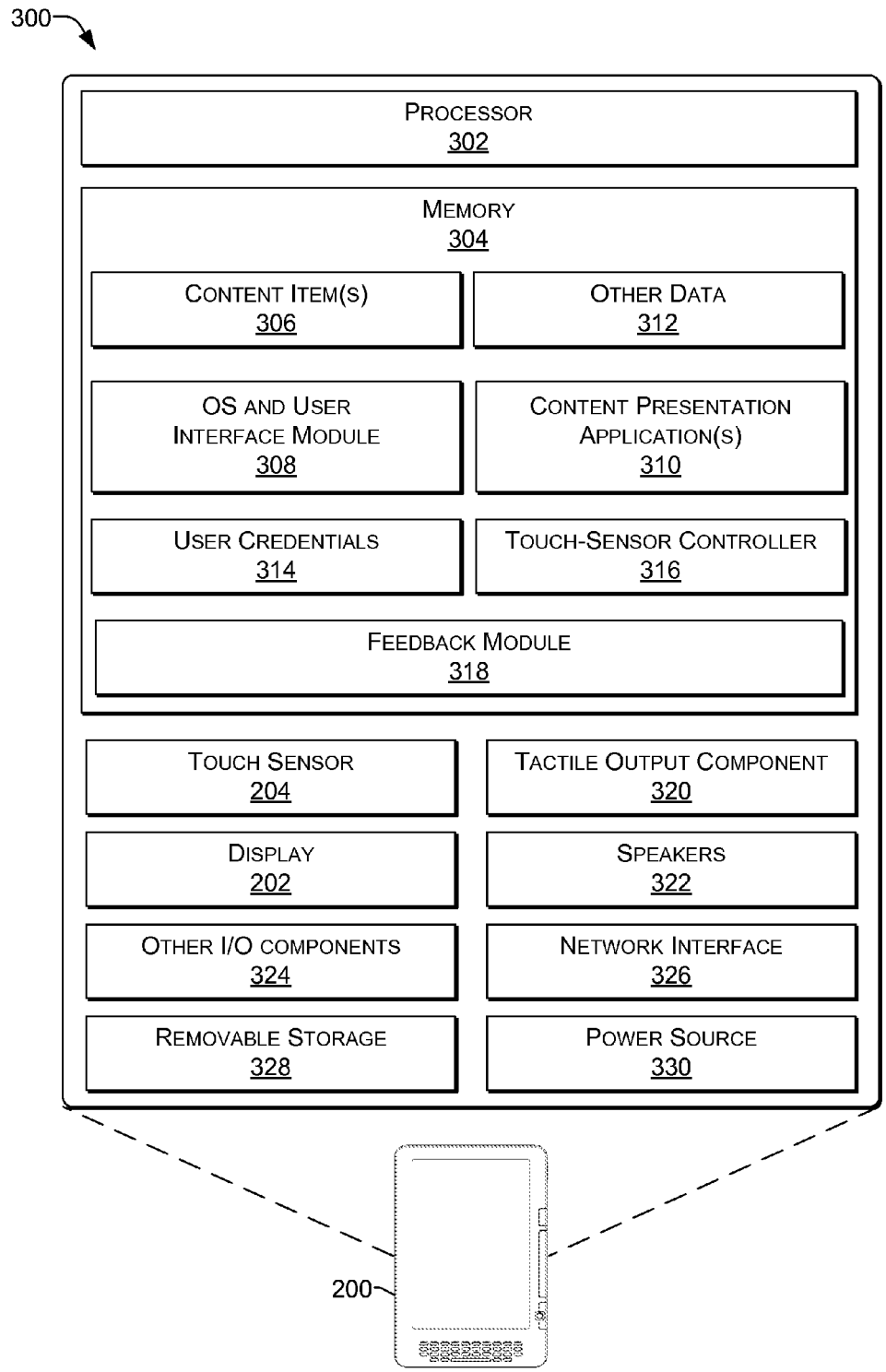
FIG. 3 is a block diagram illustrating selected modules and components of an electronic device able to provide tactile interaction with content.

FIG. 3 is a block diagram 300 of select example components of the electronic device 200 according to some implementations. In a very basic configuration, the electronic device 200 includes or accesses components such as at least one processor 302 and a memory 304. Each processor 302 may itself comprise one or more processors or cores. Depending on the configuration of the electronic device 200, the memory 304 (and other memories described throughout this document) may be an example of non-transitory computer storage media and may include volatile and nonvolatile memory. Thus, the memory 304 may include, but is not limited to, RAM, ROM, EEPROM, flash memory, or other memory technology, or any other medium that can be used to store media items or applications and data which can be accessed by the electronic device 200.

The memory 304 may be used to store any number of functional components that are executable on the processor 302, as well as data and content items that are rendered by the electronic device 200. Thus, the memory 304 may store one or more content items 306, such as eBooks, audio books, songs, videos, still images, and the like. The memory 304 may further include a memory portion designated as an immediate page memory (not shown) to temporarily store one or more pages of an electronic book or other content item 306. The pages held by the immediate page memory are placed therein a short period before a next page request is expected.

The term "page," as used herein, refers to a collection of content that is presented at one time in a display of the electronic device 200. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

The memory 304 may store an operating system (OS) and user interface module 308 that is executable by the processor 302. For example, the operating system may include a kernel operatively coupled to one or more device drivers and provide a user interface for enabling a user to access functions and features of the electronic device 200. One feature of the OS and user interface module 308 allows a user to select one of the content items 306 for consumption on the electronic device 200. For instance, the OS and user interface module 308 may allow the user to scroll through a list of available content items 306 for selecting a particular content item 306 to consume, such as by displaying, playing, or the like. The OS and user interface module 308 may facilitate textual entry of a selection (e.g., via a cursor, controller, keyboard, etc.), audible entry of a selection (e.g., via a microphone), or entry of a selection in any other manner. The OS and user interface module 308 may provide menus and other navigational tools to facilitate selection and rendering of the content items 306. The interface module 308 may further include a browser or other application that facilitates access to sites over a network, such as websites or online merchants.

One or more content presentation application(s) 310 may be provided for rendering the content items 306. The content presentation application(s) 310 may be implemented as various applications depending upon the content items. For instance, the application(s) 310 may include an electronic book reader application for rendering electronic books, images, etc., an audio player for playing audio books or songs, a video player for playing video, and so forth. The memory 304 may also store other data 312 in addition to content items 306. Examples of other data 312 may include executable programs and associated data, databases, user settings, configuration files, device status, and so forth.

The memory 304 may also store user credentials 314. The user credentials 314 may be device-specific (set during manufacturing) or provided as part of a registration process for a service. The credentials 314 may be used to ensure compliance with digital rights management (DRM) aspects of rendering the content items 306.

The memory 304 also may store a touch-sensor controller 316 to detect touch inputs received via the touch sensor 204. The touch-sensor controller 316 may be configured to accept input from the touch sensor 204 to determine characteristics of interaction with the touch sensor 204. These characteristics may include the location of one or more touch inputs on the touch sensor 204, magnitude of the force of a touch input, shape of the touch, and so forth. In some instances, the touch-sensor controller 316 is configured to detect multiple touches on the touch sensor 204 as well as to measure an amount of force of each of the touches.

The electronic device 200 further includes the touch sensor 204 described above, which enables a user of the device to operate and interact with the electronic device 200 via touch inputs. In one implementation, the touch sensor 204 may be placed behind the display 202, such that user input through contact or gesturing relative to the display 202 may be sensed by the touch sensor 204. In another implementation, the touch sensor 204 may be placed in front of the display 202, or in another part of the device altogether. In some instances, the touch sensor 204 and the display 202 are integral to provide a touch-sensitive display that displays content items 306 and allows users to navigate the content items 306 via touch inputs on the display 202.

FIG. 3 further illustrates the display 202, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 202 may be an active display such as a liquid crystal display, plasma display, light emitting diode display, organic light emitting diode display, and so forth, may be used. These displays may comprise drive electronics, such as a display drive matrix configured to affect individual pixels within the display 202.

In some implementations, the display 202 may be a 3D display capable of providing a 3D image. For example, the display 202 may produce a 3D image by providing alternating left-eye and right-eye images with or without the use of shuttering or filtering eyeglasses. Other techniques for providing a 3D image include providing a stereoscopic image, an autostereogram, or the like.

In some implementations, multiple displays 202 may be present on the electronic device 200. These multiple displays may be located in the same or different enclosures or panels. When multiple displays are present, these displays may be of the same or different types. For example, one display may be an electrophoretic display while another may be a light emitting diode display. For convenience only, the display 202 is shown in a generally rectangular configuration. However, it is understood that the display 202 may be implemented in any shape, and may have any ratio of height to width. Also, for stylistic or design purposes, the display 202 may be curved or otherwise non-linearly shaped. Furthermore, the display 202 may be flexible and configured to fold or roll.

FIG. 3 further illustrates that the memory 304 stores a feedback module 318 that is executable on the processor 302 to determine output to be provided to a user for interaction with the user. For example, feedback module 318 may receive, through touch sensor controller 316, information regarding one or more touch inputs detected by the touch sensor 204. Feedback module 318 may determine suitable output to be provided based on the content item 306 currently being displayed and the location and/or force of the received touch input information. Upon determining suitable output, the feedback module 318 may provide information to or may directly control one or more output or feedback components such as a tactile output component 320. As discussed above and as described additionally below, in some implementations, tactile output component 320 may include one or more haptic actuators, such as piezoelectric actuators. For example, in some implementations, the tactile output component 320 may be embodied as a plurality of haptic actuators that may be located directly beneath and in contact with the display 202 for providing localized tactile output to a finger of a user that is touching the display 202. Thus, the haptic actuators may impart varying levels and intensities of vibration to a localized area of the display 202. Additionally, in other implementations, the tactile output component 320 may be embodied as a mildly electrified transparent grid provided on the surface of the display 202 for imparting varying low intensities of detectable electric stimulus to a user's finger. Other types of variable tactile output components 320 may also be used in accordance with some implementations herein.

In addition to the tactile output, feedback module 318 may also specify audio output to be provided through one or more audio speakers 322. For example, in conjunction with a variation in a level of intensity of the tactile output, a sound may be provided that changes pitch and/or volume as the level of intensity of the tactile output varies. In one example of use, as the user's finger slides along the surface of the display 200, the level of intensity of the tactile output may increase or decrease based on displayed features of an image, and contemporaneously, a sound produced by the feedback module 318 through speakers 322 may increase or decrease in pitch, volume, etc. Additionally, one or more features displayed by the display 202 may visually change, become animated, be added or deleted, etc., as visual feedback provided the feedback module 318 in conjunction with the tactile output and the sound output.

The electronic device 200 may further be equipped with various other input/output (I/O) components 324. Such I/O components may include various user actuable controls (e.g., buttons, a joystick, a keyboard, etc.), a microphone, a camera, connection ports, and so forth. For example, the operating system of the electronic device 200 may include suitable drivers configured to accept input from the touch sensor, keypad, keyboard, or other user actuable controls and devices included as the I/O components 324. For instance, the user actuable controls may include page turning buttons, navigational keys, a power on/off button, selection keys, and so on.

A network interface 326 supports both wired and wireless connection to various networks, such as cellular networks, radio, WiFi networks, short-range or near-field networks (e.g., Bluetooth®), infrared signals, and so forth. The network interface 326 may allow a user of the electronic device 200 to download content items 306 from a content item service, such as a from a website or other online service. The network interface 326 may further allow a user to access storage on another device, such as a user's computing device, a network attached storage device, or the like. For example, a user may download content items to a computing device and subsequently transfer the content items to the electronic device 200.

Additionally, the electronic device may include removable storage 328. Examples of removable storage 328 include flash memory and memory cards such as secure digital (SD) cards, mini SD cards, micro SD cards, SD high capacity (SDHC) cards, universal serial bus (USB) storage devices, and other removable storage devices and media. For example, a user may insert a removable storage device containing one or more content items, such as for consuming the one or more content items on the electronic device 200 or for transferring the one or more content items to memory 304.

The electronic device 200 may also include a power source 330, such as a battery and power control unit. The power source 330 may operatively control an amount of power, or electrical energy, consumed by the electronic device. Actively controlling the amount of power consumed by the electronic device 200 may achieve more efficient use of electrical energy stored by the power source 330.

The electronic device 200 may have additional features or functionality. For example, the electronic device 200 may also include a hard drive using magnetic, optical, or solid-state storage to store information, various interfaces or ports supporting various protocols, a global positioning system (GPS) device, a PC Card component, and so forth.

Various instructions, methods and techniques described herein may be considered in the general context of computer-executable instructions, such as program modules stored on computer storage media, such as memory 304 and executed by the processor 302. Generally, program modules include routines, programs, objects, components, data structures, etc. for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 4B:
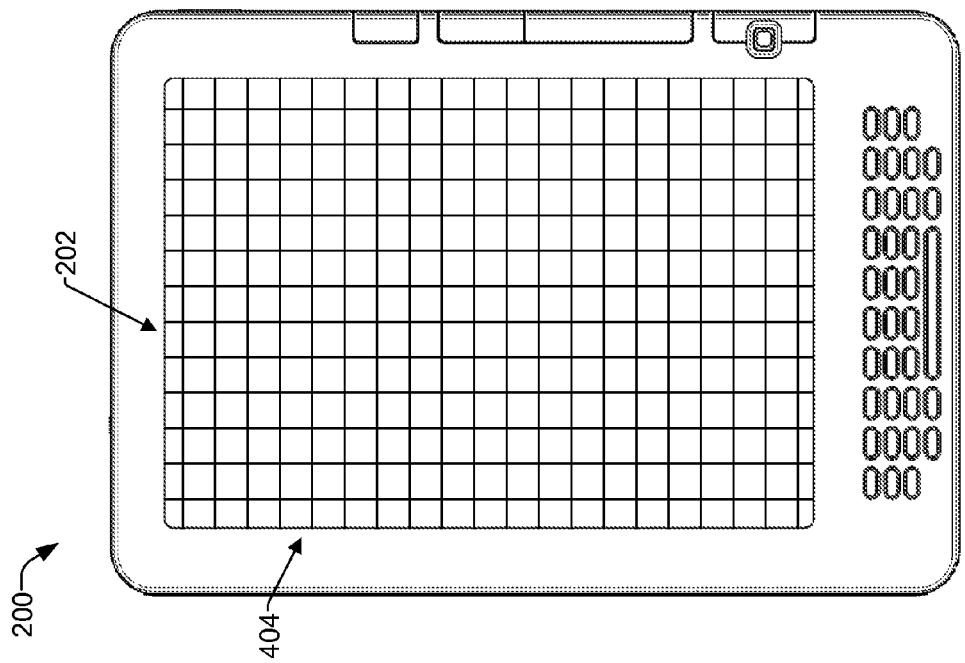
FIGS. 4A-4B illustrates several examples of electronic device configurations for generating tactile output.
Figure 4A:
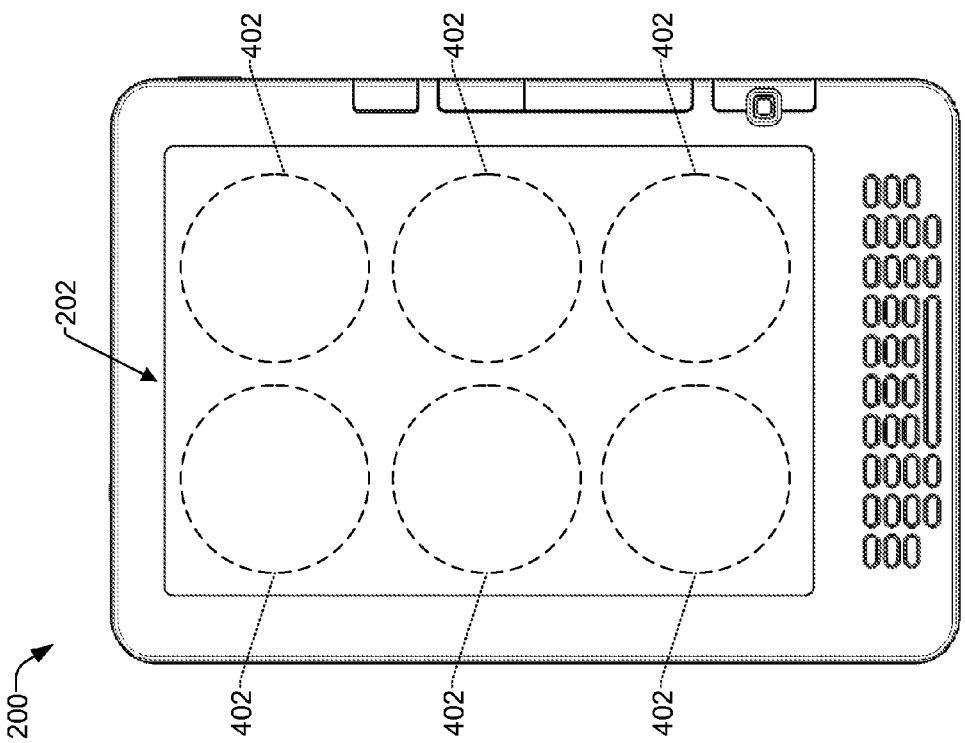

FIGS. 4A-4B illustrate several examples of electronic device configurations for delivering localized tactile output according to some implementations. As illustrated in FIG. 4A, in some implementations, electronic device 200 may include one or more haptic actuators 402, such as piezoelectric actuators, or other mechanical devices for producing a vibration or other physically detectable tactile output. In some implementations, to produce the tactile output, the electronic device 200 may include haptic output and feedback components, as described in U.S. patent application Ser. No. 12/829,916, to Buuck et al., filed Jul. 2, 2010, entitled "Piezoelectric Haptic Actuator Integration," the entire disclosure of which is incorporated herein by reference. For example, in some implementations of the electronic device 200, the actuators 402 may be integrated piezoelectric haptic actuators, as described by Buuck et al., that are configured to generate a localized haptic or vibrotactile output which may be felt by the user's finger. For example, a plurality of haptic actuators 402 may be located on and in contact with a backside of the display 202. The haptic actuators 402 may impart varying levels, intensities and types of vibration to a localized area of the display 202.

Additionally, in some implementations as illustrated in FIG. 4B, the tactile output may be provided as an inductive or mild electrical stimulus generated by a grid 404 of conductors located on the surface of the display 202. For example, the grid 404 may be made using thin film transparent conductors that may be overlaid on the surface of the display 202. When a user touches the grid 404, a low-level electrical stimulus or "buzz" may be generated as tactile output that is detectable by the user. The amount of electrical stimulus may be varied based on the location on the grid 404 that the user is touching in correlation with an image rendered on the display, as described according to implementations herein. The grid may be laid out with x-y coordinates for providing a determined amount of electrical stimulus to particular portions of the grid 404 in conjunction with an image rendered on the display 202. Further, in some implementations, the tactile output may include both mechanical vibration and electrical stimulus.

Additionally, in some implementations, the conductive grid 404 may also serve as a touch sensor for determining a location of a user touch input. Alternatively, the grid may function on induction or magnetic/electric field distortion and may be embedded in the display 202 or located on the underside of the display. In addition, other alternatives to touch sensor 204 may include projecting a grid pattern or interactive area onto the display 202 from an attached or external source (e.g., by an attached projector positioned to point at the display 202). An interactive signal may be detected by the projector, such as via wireless signal, light or sound waves. For example, a grid may be projected over an image of a map on the display 202. When the user's finger touches a point on the map, a detector may detect where the user's finger touches the display based on RF interference created by distorting a known signal pattern. In other implementations, the touch location may be determined based on detecting where a portion of the light shining on the display is blocked by the user's finger. Still alternatively, the touch location may be detected based on sound or echolocation. For example, one or more microphones may detect the sound and software may determine a distance and location of the finger (sonic feedback). Additionally, several of the foregoing techniques may be combined for detecting a touch location and/or for providing tactile output. Further, while the foregoing discussion describes several examples of configurations for detecting a touch input location and providing localized tactile output, the techniques herein are not limited to these examples, and may encompass other devices and configurations for detecting a touch input location and providing tactile output.

Variable Tactile Output

Figure 5:
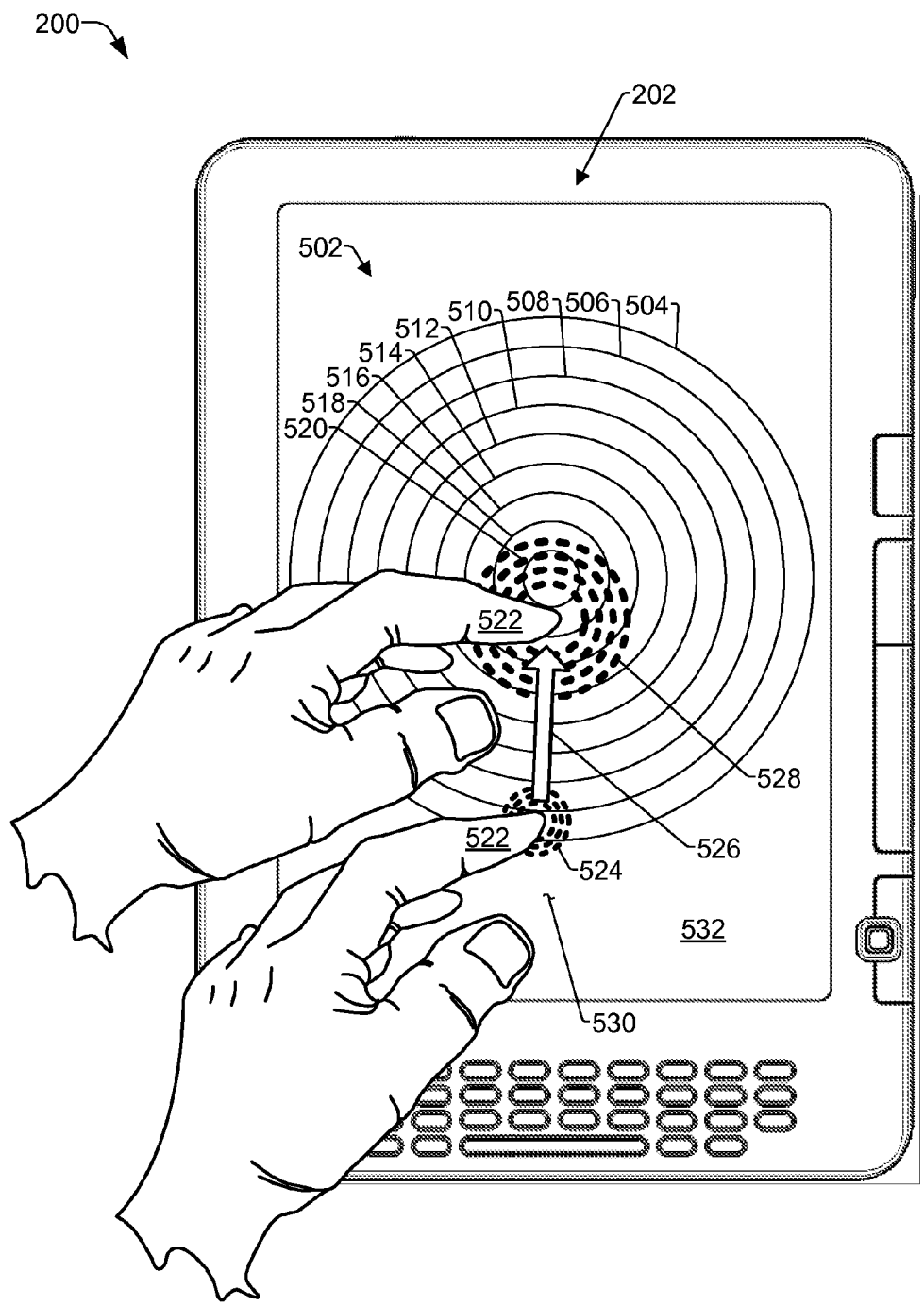
FIG. 5 illustrates an example of tactile interaction with content.

FIG. 5 illustrates an example of variable interactive output provided to a user of the electronic device 200 according to some implementations. In the illustrated example, a content item 502, such as an eBook, image, video or the like, is rendered on the display 202 of the electronic device 200. The content item 502 includes a plurality of concentric circles 504-520 which may represent contour lines, hierarchies, steps, levels, or the like. In one example of use, when a user's finger 522 touches the display 202, such as at an outer circle 504 of the displayed content item 502, a first level of tactile output 524 may be provided by the electronic device 200 at the location at which the user's finger is touching, as indicted by the broken lines. As the user's finger slides inward in the direction of arrow 526 to an inner circle 518, the level of tactile output may increase to a second level of tactile output 528, as indicated by the broken lines. Consequently, in some implementations, as the user's finger passes over each of the circles 504-520 the level of tactile output may increase in intensity at each of the circles 504-520. Thus, circle 504 may have a low level of tactile output intensity associated therewith, circle 506 may have a slightly higher level of tactile output intensity associated therewith, and so on. In some implementations, the level of tactile output may vary in a stepwise manner from one circle to the next, while in other implementations, the variation in intensity may take place continually as the user's finger moves inward. Numerous other variations are possible. As one example, the level of intensity of the tactile output may vary in the opposite direction, i.e., being at a higher level on the outer circle 504, and at a lower level at the inner circle 520. As another example, the output may start out low at the outer circle 504, increase to a higher level at one of middle circles 512, and then decrease again toward the center circle 520. Further, in some implementations when the user's finger touches the display on an area 530 outside of the circles 504-520, such as a background of the image, no tactile output might be provided. As the user's finger slides along a surface 532 of the display 202, and reaches the outer circle 504, the tactile output may begin. Alternatively, in other implementations, the tactile output may begin at a low level when the user touches the background area 530, and may increase as the user touches one or more of the circles 504-520 in the foreground. Thus, the tactile output provided may vary in numerous ways, depending on what the content item 502 represents and/or how an author, publisher or user desires the tactile output to be provided.

Additionally, in some implementations, rather than sliding a finger 522 along the surface 532 of the display 202, the user may lift the finger 522 and touch various different locations of the content item 502 to feel tactile output of varying intensities. For example, the user's finger may touch the outer circle 504 and feel tactile output of a first intensity level, and the user may then touch the center circle 520 to feel tactile output of a second intensity level, different from the first, and so forth.

Further, as discussed above, audio and visual output may also be provided with the tactile output. For example, as the user's finger slides from the outer circle 504 to the inner circle 520, audio output, such as a sound may be produced by the electronic device. As one example, as the tactile output increases or decreases in intensity, the sound may change to a different sound, may increase or decrease in volume, may change pitch, and so forth. Additionally, visual output may also be provided in conjunction with the tactile output. For example, as the tactile output increases or decreases in intensity, the image or the display itself may be altered, such as increasing or decreasing brightness or contrast, changing color, becoming animated, changing configuration of one or more features of the image, replacing the image with a new image, or the like.

Figure 6:
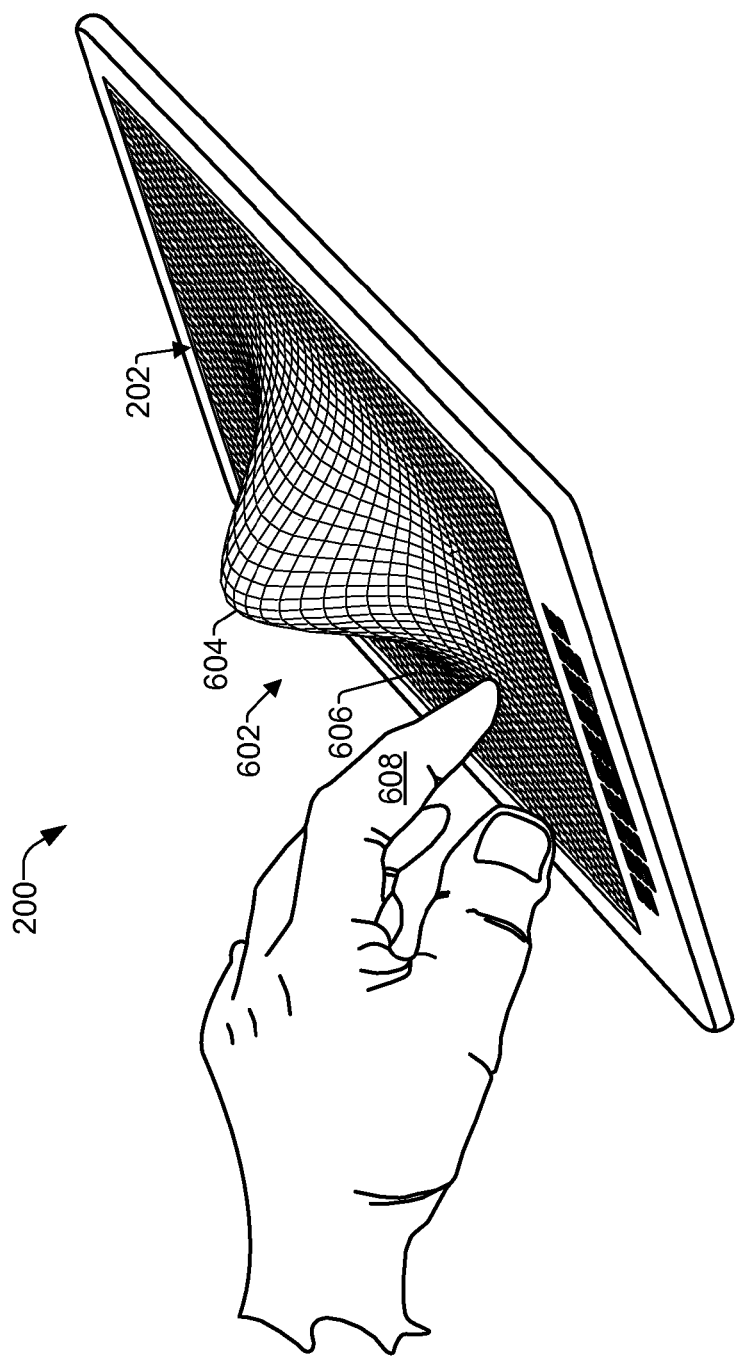
FIG. 6 illustrates another example of tactile interaction with content.

FIG. 6 illustrates another example of providing tactile output according to some implementations herein. In the example of FIG. 6, a 3D image 602 is provided by the display 202, such as by using the techniques discussed above. The 3D image 602 of this example includes a raised portion 604 and a lower portion 606. The user may touch the surface of the display 202 as described above with reference to FIG. 5. In one example, as the user's finger 608 slides along the surface of the display toward the raised portion 604 of the image 602, the level of tactile output provided may increase in intensity. Thus, the user's finger is able to feel a localized tactile output at the location that the user's finger is touching, and the tactile output may increase as the user's finger moves in a particular direction, such as toward the raised portion 604 of the 3D image 602. Numerous variations, such as those described with respect to FIG. 5 may also be applied to the implementation of FIG. 6, depending on the context of the image, the impression or idea to be conveyed, and the like.

Figure 7:
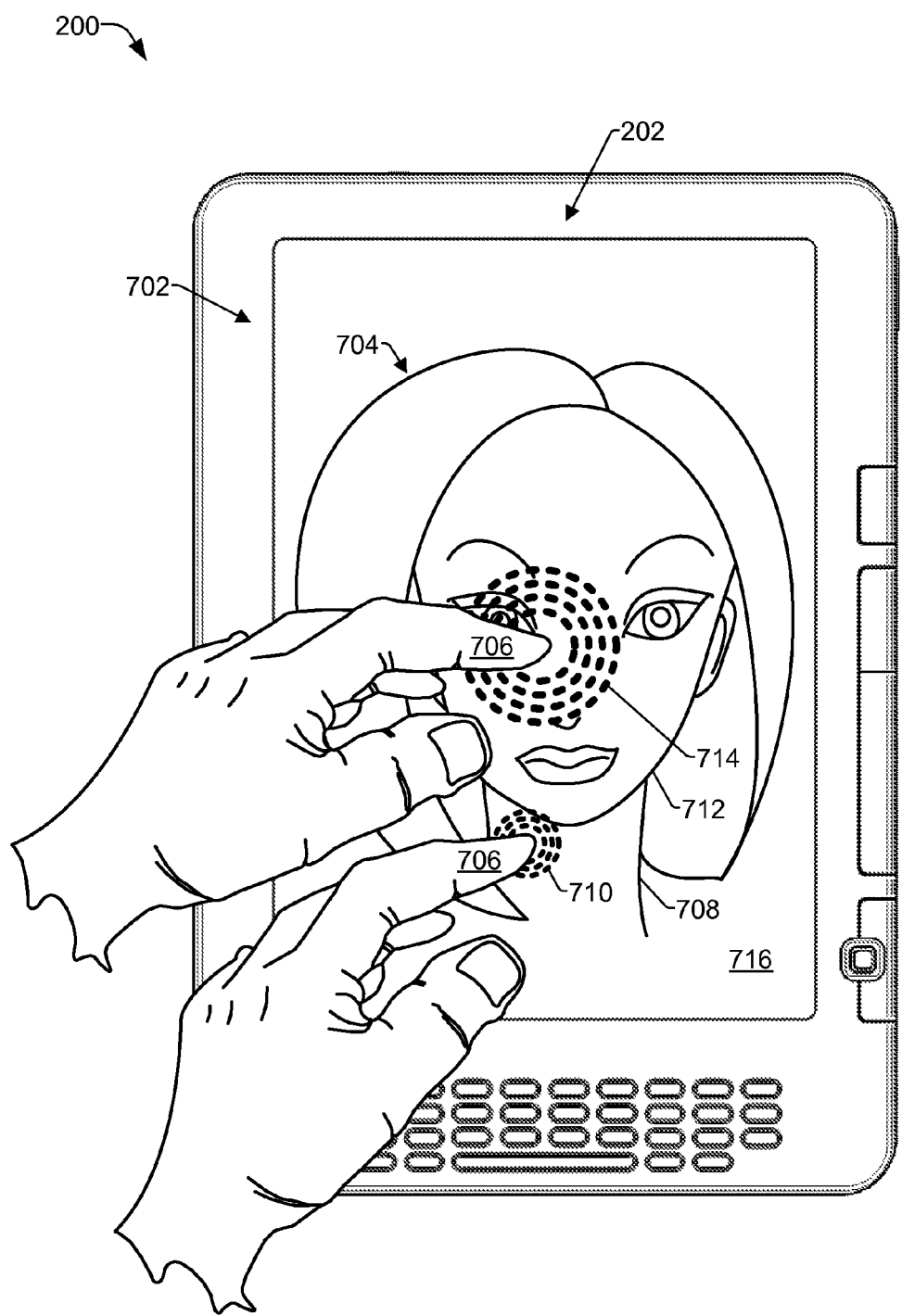
FIG. 7 illustrates another example of tactile interaction with content.

FIG. 7 illustrates another example of variable tactile output in conjunction with a content item 702. As mentioned above, the variable tactile output is not limited to use with images having contour lines. Rather, implementations of the variable tactile output herein may be used with a variety of content items including images, videos, e-books, audio books, and so forth. In the example illustrated in FIG. 7, content item 702 rendered on the display 202 may be for example, an image or video. In this example, the content item 702 includes a head and neck of a person 704 displayed on the display 202. When a user touches the display 202, different levels of tactile output may be generated when the user's finger 706 touches different portions of the image. For example, when the user's finger 706 touches the neck 708, a first level of tactile output 710 may be provided as indicated by the broken lines. On the other hand, when the user's finger 706 touches center of the face 712 of the person 704, a second level of tactile output 714 may be provided as indicated by the broken lines. For example, as the user's finger 706 moves from a peripheral portion of the person's image, such as the neck or hair, to particular features such as the nose, eyes, mouth etc., the level of tactile output may be increased, such as when the particular features are touched. Additionally, a lower level of tactile output may be provided when the user's finger 706 touches the other parts of the person's head, neck, etc., and an even lower level of tactile output may be provided when the user touches a background portion 716 of the image 702. Consequently, various different types of content items may be consumed with variable tactile output for achieving desired feedback effects.

Further, as mentioned above, in some implementations, the feedback may be generated based on metadata provided with the content item. In other implementations, the feedback module 318 may identify foreground portions of a content item from background portions, and may assign tactile output to various features recognized in the image. In some implementations, the feedback module 318 may include facial recognition technology for recognizing facial features. For example, the feedback module 318 may assign a higher intensity tactile output to the nose of a person in an image, lower levels of tactile output to the eyes and mouth, still lower levels of tactile output to the cheeks and forehead, and so forth.

Figure 8B:
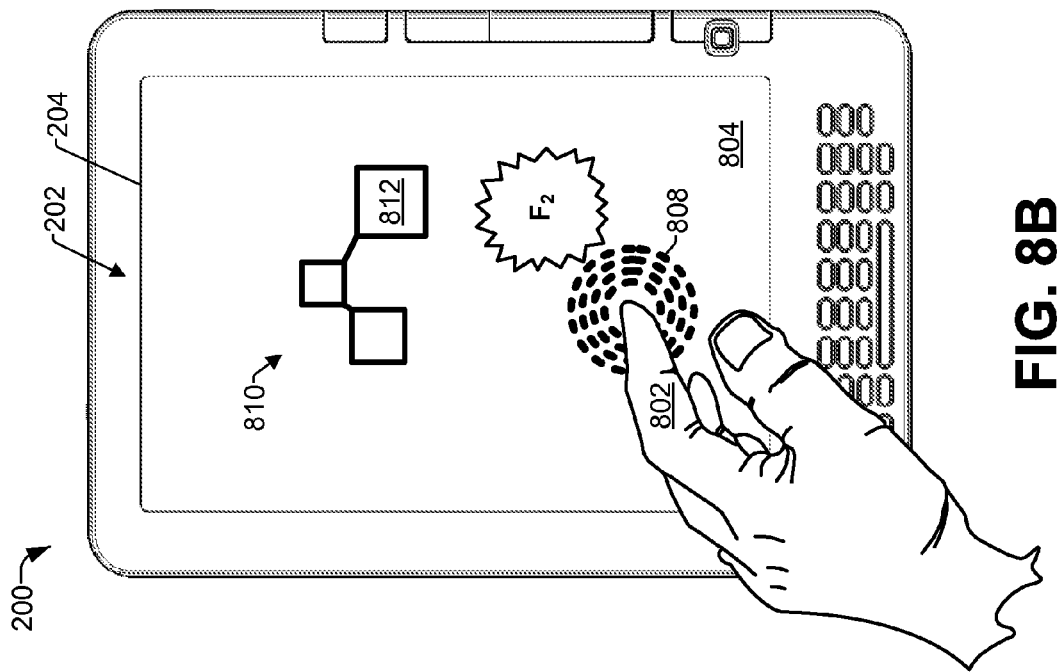
FIGS. 8A-8B illustrate another example of tactile interaction with content, including variation in tactile output based on variation in a force of an input.
Figure 8A:
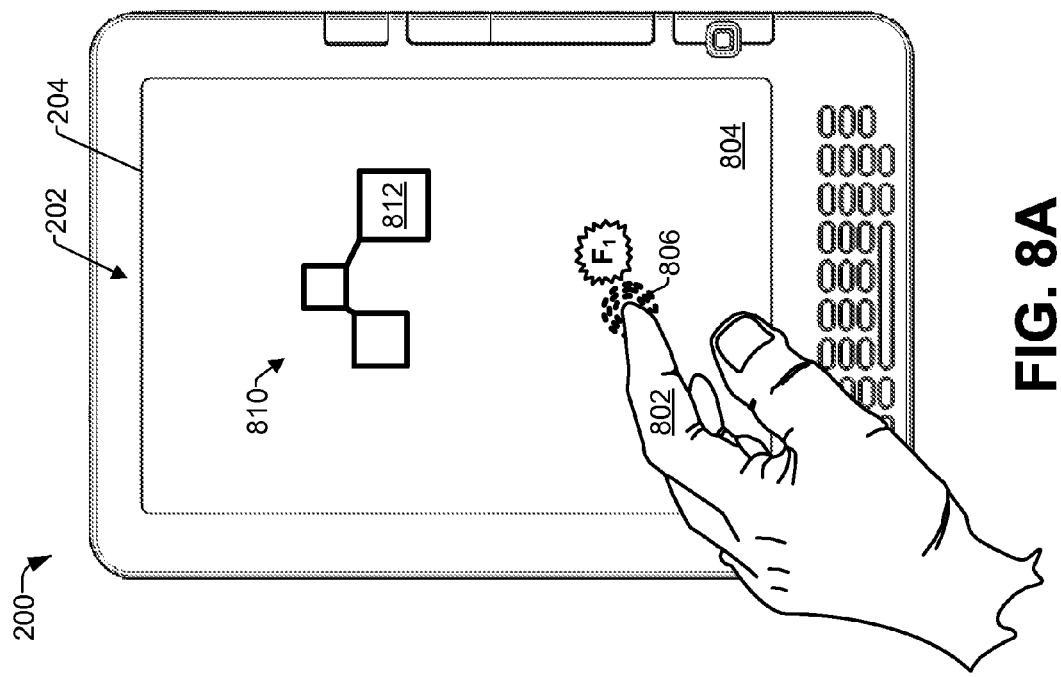

FIGS. 8A-8B illustrate an example of variable tactile output in response to variations in force applied to the display 202 and/or the touch sensor 204. For example, as illustrated in FIG. 8A, when a user's finger 802 touches the surface 804 of the display 202 with a first level of force $F_1$, a first level or type of localized tactile output 806 may be provided as indicated by the broken lines. On the other hand, as illustrated in FIG. 8B, when the user's finger 802 touches the display 202 (at the same or different location) with a second, greater level of force $F_2$, a second, different level or type of localized tactile output 808 may be provided as indicated by the broken lines. For example, the first level of force $F_1$ may be within a first range of forces (e.g., $F_A < F_1 < F_B$) and the second level of force $F_2$ may be within a second range of forces, greater than the first range (e.g., $F_C < F_2 < F_D$ where $F_B \leq Fe$). Multiple ranges may be provided for detecting multiple different levels of force and providing corresponding different levels of tactile output. Additionally, in some implementations, a user may gradually increase the force of the touch input, resulting in a gradual increase in the level of tactile output. Furthermore, the relationship between the level of force and the level of tactile output may be reversed in some implementations, so that a smaller level of force results in a larger level of tactile output and vice versa.

In one example, an eBook or other content item may include an image 810 having a particular feature 812 displayed on the display 202. When the user's finger 802 touches the particular feature 812 with the first level of force $F_1$, a first type or intensity of tactile output may be generated, the feature 812 may change visually to a first configuration, and the electronic device may produce a first sound. When the user's finger 802 touches the particular feature 812 with the second level of force $F_2$, a second type or intensity of tactile output may be generated, the feature 812 may change visually to a second configuration, and the electronic device may produce a second sound. For instance, if the tactile output increases or decreases in intensity in response to touch inputs of different forces, the sound may change to a different sound, may increase or decrease in volume, may change pitch, and so forth. Additionally, as the tactile output increases or decreases in intensity, the image or the display itself may be altered, such as increasing or decreasing brightness or contrast, changing color, changing configuration of one or more features of the image, replacing the image with a new image, or the like. Numerous other variations will be apparent in light of the disclosure herein.

Figure 9A:
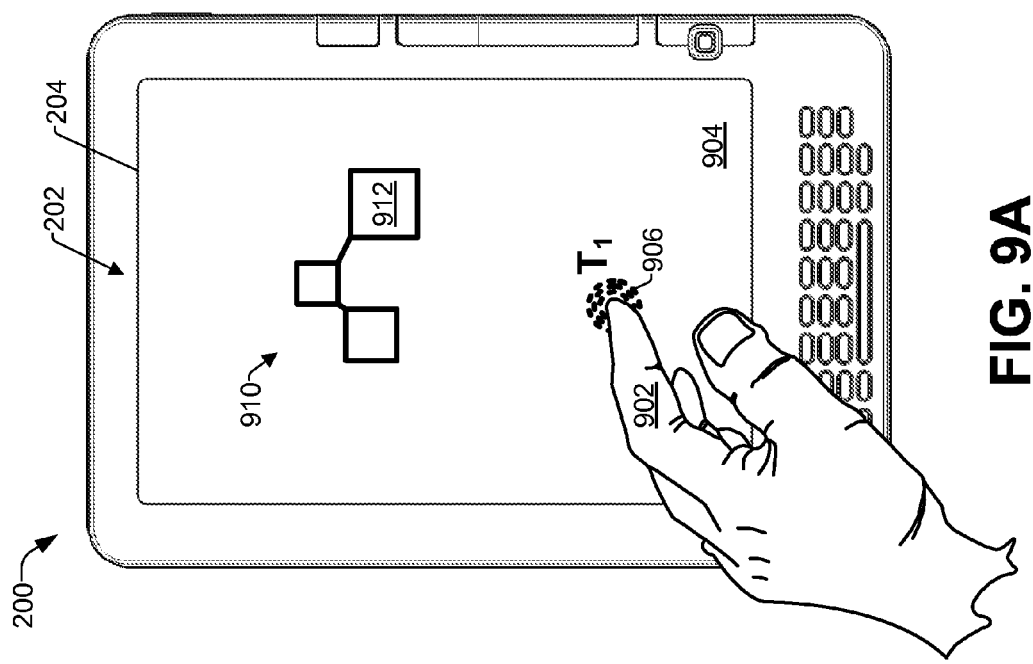
FIGS. 9A-9B illustrate another example of tactile interaction with content, including variation in tactile output based on variation in a duration of an input.
Figure 9B:
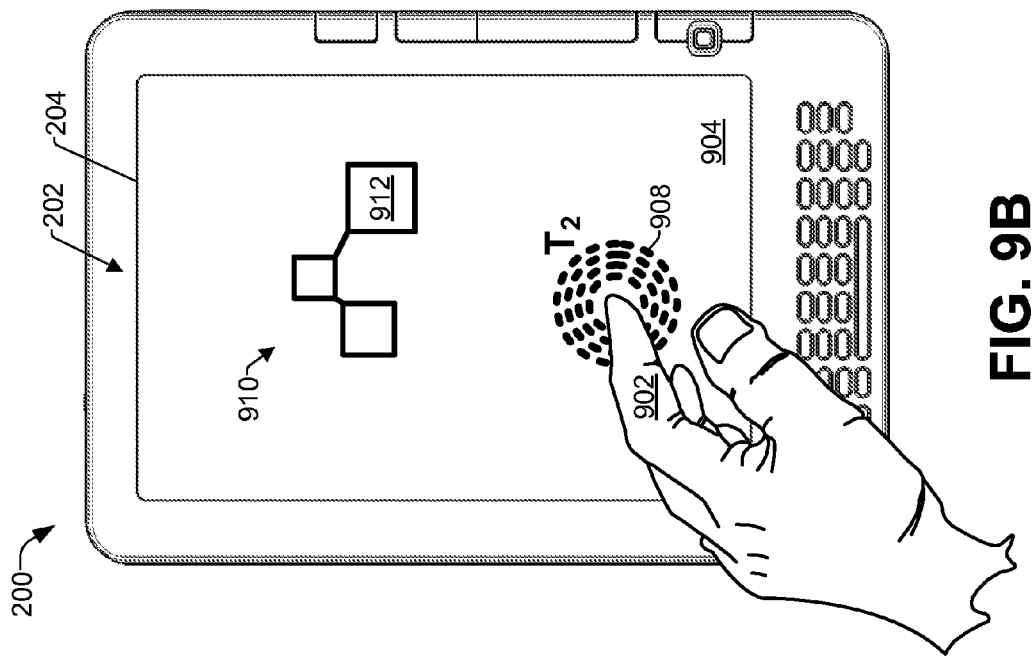

FIGS. 9A-9B illustrate an example of variable tactile output in response to detection of a time duration of a touch input applied to the display 202 and/or the touch sensor 204. For example, as illustrated in FIG. 9A, when a user's finger 902 touches the surface 904 of the display 202 for a first time duration $T_1$, a first intensity level or type of localized tactile output 906 may be provided as indicated by the broken lines. On the other hand, as illustrated in FIG. 9B, when the user's finger 902 touches the display 202 (at the same or different location) for a second, longer duration of time $T_2$, a second, different level or type of localized tactile output 908 may be provided as indicated by the broken lines. For example, the first duration of time $T_1$ may be within a first range of time (e.g., $T_A < T_1 < T_B$) and the second duration of time $T_2$ may be within a second range of time, greater than the first range (e.g., $T_C < T_2 < T_D$ where $T_B \leq T_C$). Multiple ranges may be provided for detecting multiple different durations of time and providing corresponding different levels or types of tactile output. Additionally, the tactile output need not change in a stepwise manner, but instead, may change gradually as the time of the touch input increases. For example, as the user's finger touches the display for an increasing time duration, the tactile output may correspondingly increase in intensity as the time duration increases. Furthermore, the relationship between the duration of time and the level of tactile output may be reversed in some implementations, so that a longer duration of time results in a smaller level of tactile output and vice versa.

In one example, an eBook or other content item may include an image 910 having a particular feature 912 displayed on the display 202. When the user's finger 902 touches the particular feature 912 for a first duration of time $T_1$, a first type or intensity of tactile output may be generated, the feature 912 may change visually to a first configuration, and the electronic device may produce a first sound. When the user's finger 902 continues to touch the particular feature 912 until the second duration of time $T_2$ is reached, a second type or intensity of tactile output may be generated, the feature 912 may change visually to a second configuration, and the electronic device may produce a second sound. For instance, if the tactile output increases or decreases in intensity as the time duration of the touch input increases, the sound may change to a different sound, may increase or decrease in volume, may change pitch, and so forth. Additionally, as the tactile output increases or decreases in intensity, the image or the display itself may be altered, such as increasing or decreasing brightness or contrast, changing color, changing configuration of one or more features of the image, replacing the image with a new image, or the like.

Figure 10A:
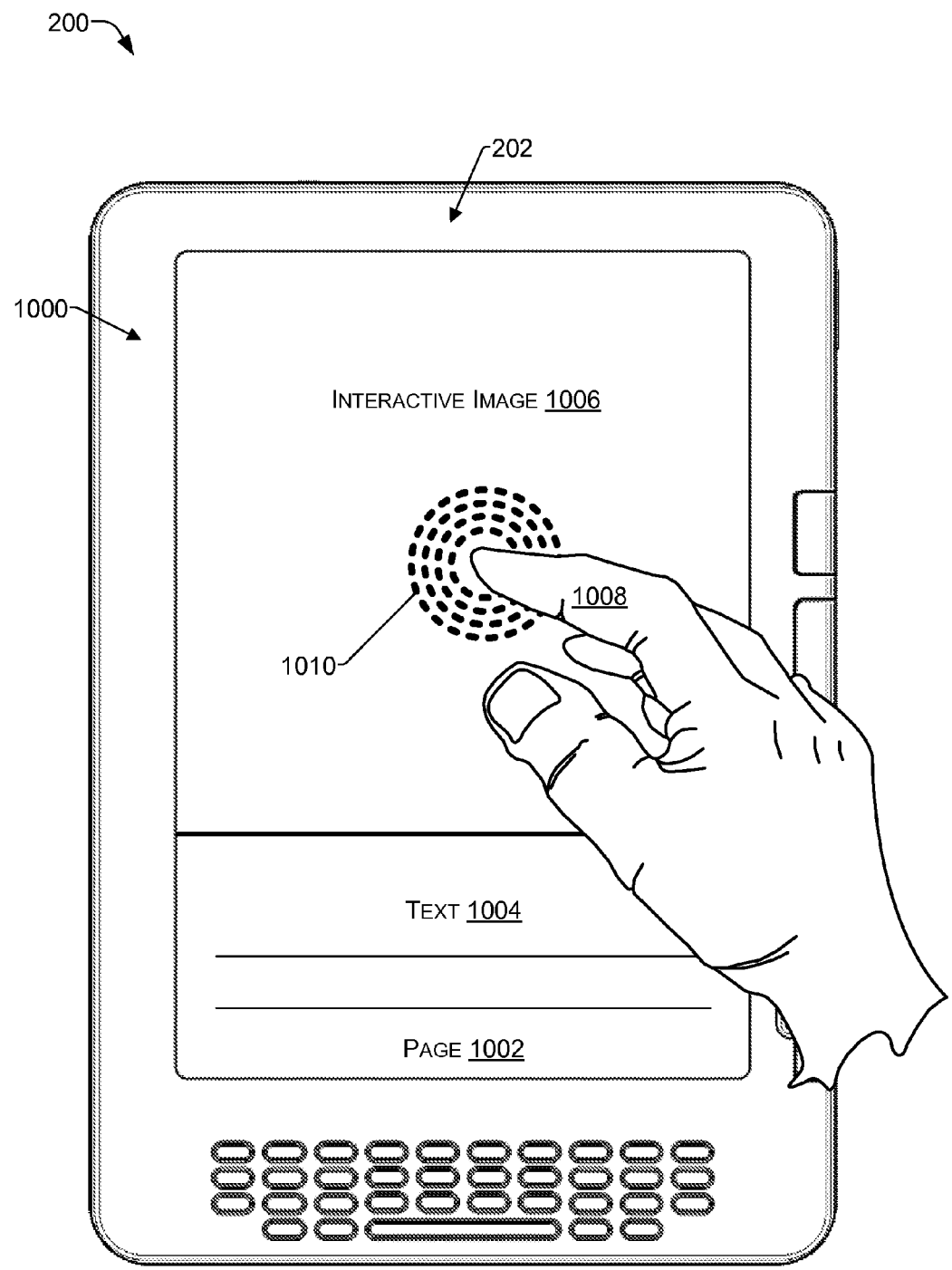
FIGS. 10A-10C illustrate examples of tactile interaction with an eBook.
Figure 10B:
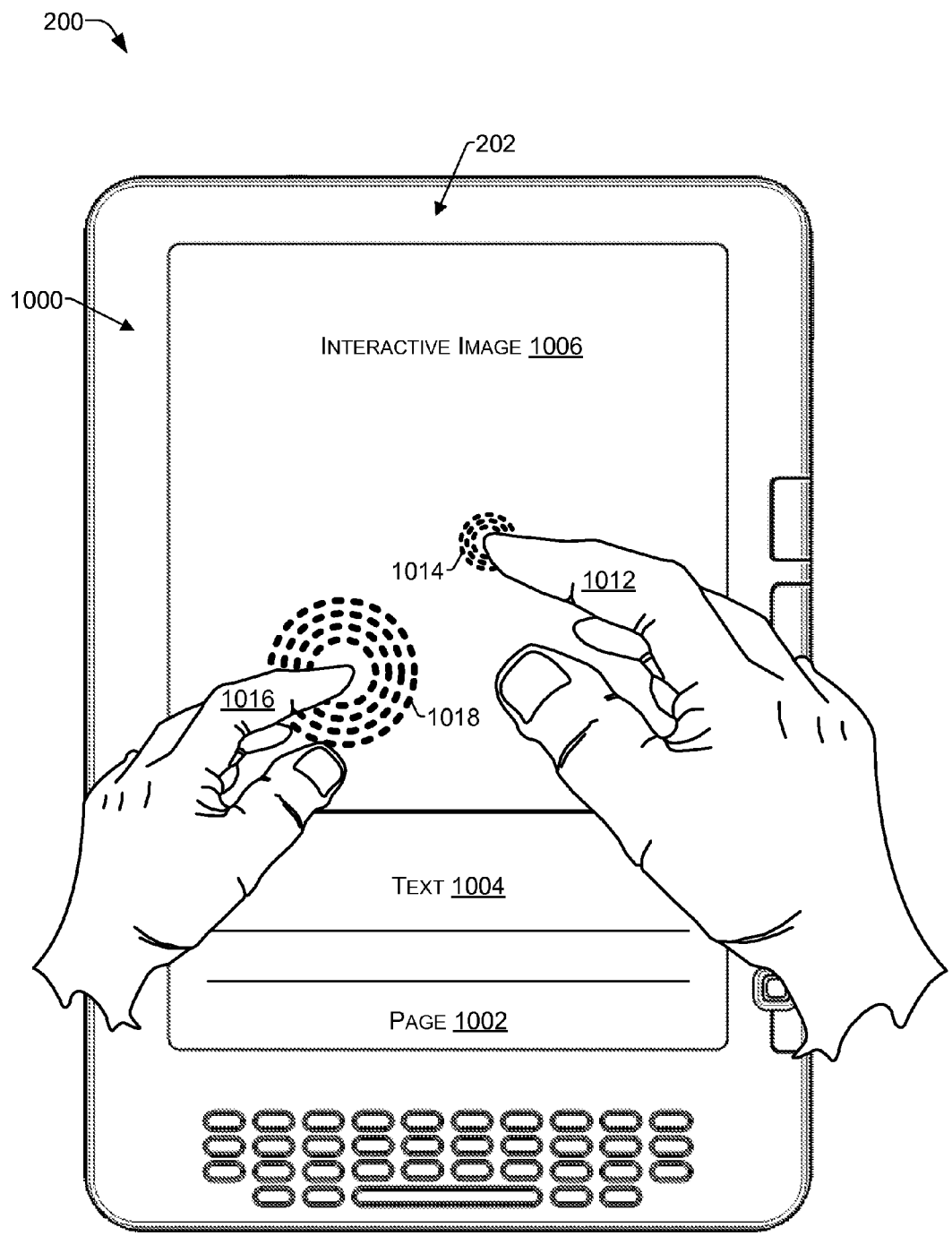
Figure 10C:
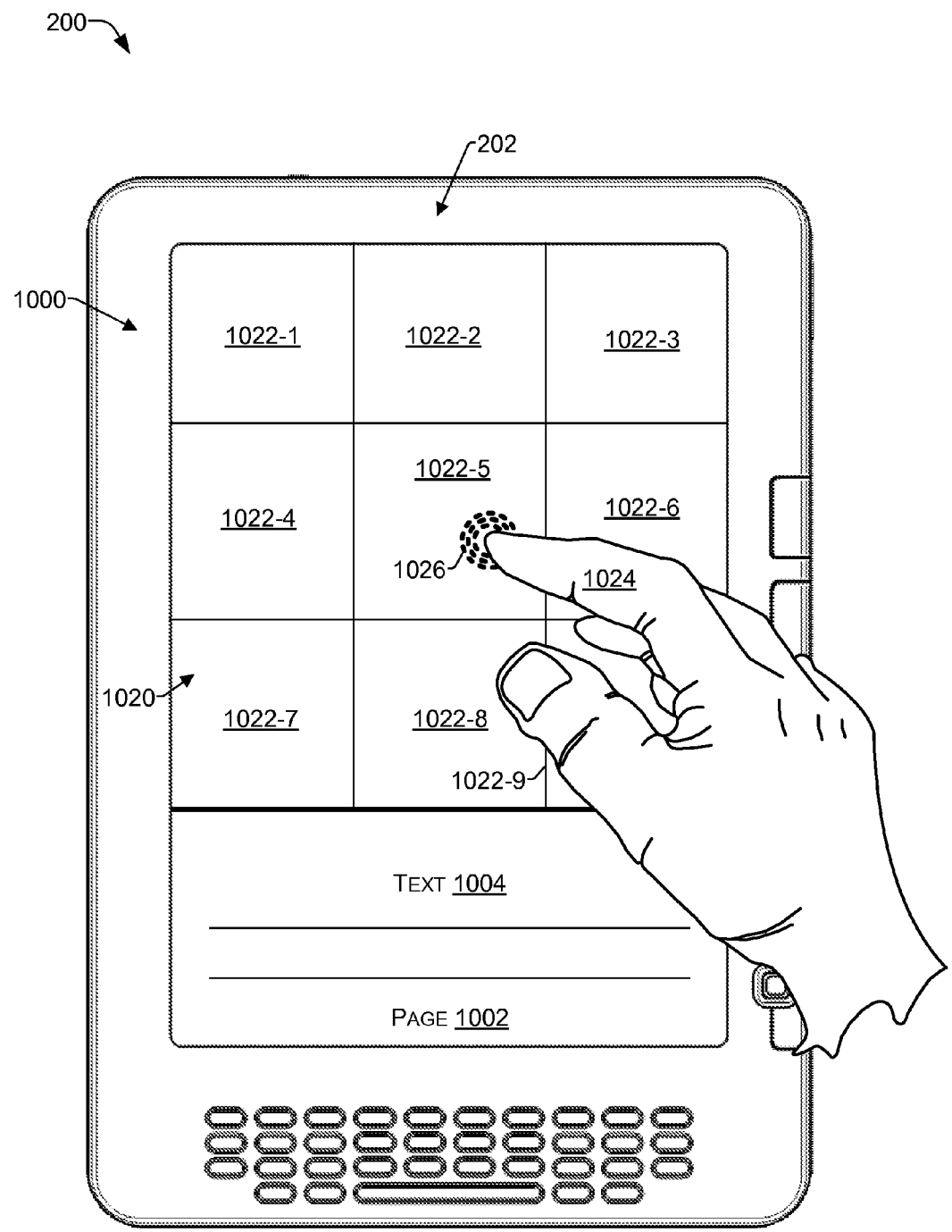

FIGS. 10A-10C illustrate examples of variable tactile output in conjunction with an eBook 1000 according to some implementations. For example, the eBook 1000 may be an interactive eBook that essentially functions as an electronic pop-up type book. In the example of FIG. 10A, a typical page 1002 of the eBook 1000 may include a text portion 1004 and an interactive image 1006. In other implementations, one or more interactive images may be mixed in with the text. The interactive image 1006 may present a still or moving image that may be touched by a user's finger 1008. In response to the touch input, variable tactile output 1010, as indicated by the broken lines, may be generated based on touching of various different features or portions of the interactive image 1006, such as based on touching of a contour or distinguishable feature of the image, a force of a touch input, a duration of a touch input, etc., as discussed above. Furthermore, in addition to the variable tactile output, sound and visual output may also be produced in response to the user's finger touching particular features or portions of the interactive image 1006. For example, in response to the user's finger 1008 touching a particular feature of the interactive image 1006, the electronic device 200 may produce one or more sounds related to the particular feature, and/or the image or the feature may also provide visual output, such as by moving, changing, etc. For instance, if the tactile output increases or decreases in intensity in response to touch inputs, the sound may change to a different sound, may increase or decrease in volume, may change pitch, and so forth. Additionally, as the tactile output increases or decreases in intensity, the image or the display itself may be altered, such as increasing or decreasing brightness or contrast, changing color, changing configuration of one or more features of the image, replacing the image with a new image, or the like. Additionally, as discussed above, in some implementations, the interactive image 1006 may be displayed as a 3D image.

Additionally, as illustrated in FIG. 10B, in some implementations, the eBook 1000 or other content item may be used by multiple users contemporaneously. For example, an adult and a child may both touch different portions of the interactive image 1006 at the same time, or sequentially, and localized tactile output may be delivered based on one or more of location, force, and duration of each touch input. As illustrated, a first user's finger 1012 may touch the interactive image 1006, such as at a first location, and/or with a first level of force and/or for a first duration. In response, first tactile output 1014 may be provided. A second user's finger 1016 may touch the interactive image 1006, such as at a second location, and/or with a second level of force and/or for a second duration. In response, a second tactile output 1018 may be provided. The touch inputs from the first user's finger 1012 and the second user's finger 1014 may be at the same time, or one may be before or after the other, and so forth. Similarly, the tactile outputs 1014, 1018 may be at the same time, or before or after, depending on the timing of the corresponding touch inputs. Further, these implementations are not limited to eBooks, but may apply to various other types of content items as well.

FIG. 10C illustrates an example in which an image 1020 is divided into a plurality of defined areas 1022-1, ..., 1022-9, with each area 1022 providing a different level of tactile output from an adjacent area 1022. For example, when a user's finger 1024 touches a first area, such as area 1022-5, a first level or type of tactile output 1026 may be provided. When the user's finger 1024 touches an adjacent area, such as a 1022-2, 1022-4, 1022-6 or 1022-8, a different level or type of tactile output may be provided. Additionally, in some implementations, each area 1022-1, ..., 1022-9 may provide a level or type of tactile output that is different from the other areas 1022-1, ..., 1022-9, and also may be associated with different sound and visual effects, as described above. Furthermore, in some implementations, the different tactile output levels may be associated with different areas of the display, regardless of the image being displayed by the display. Numerous other variations are possible. Further, while the areas 1022 are shown as being in a grid pattern in FIG. 10C, the areas 1022 may be of any shape or configuration and of various relative sizes. Additionally, these implementations are not limited to use in an eBook, by may apply to other types of content items as well.

Figure 11:
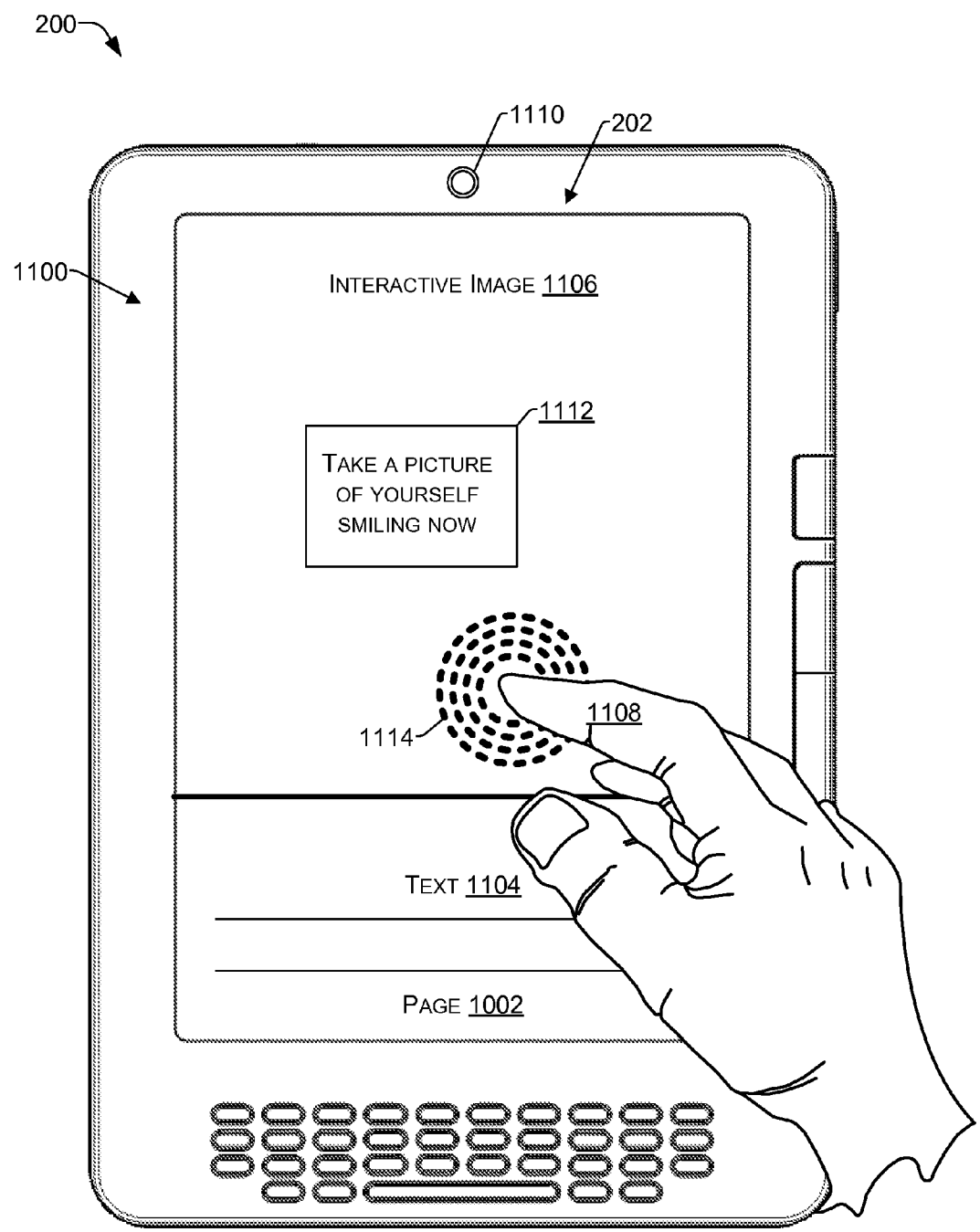
FIG. 11 illustrates an example of using a camera for interaction with an eBook.

FIG. 11 illustrates another example of an interactive eBook 1100 according to some implementations. In this example, a typical page 1102 of the eBook 1100 may include a text portion 1104 and an interactive image 1106. Although in other implementations, one or more interactive images may be mixed in with the text. For example, the interactive image 1106 may present a still or moving image that may be touched by a user's finger 1108. In this example, the user may be requested by the eBook 1100 to interact with the eBook 1100, such as by using a camera 1110. For example, when the user reaches page 1102 or interacts with page 1102 in a particular way, the user may be requested to provide an image for interaction. For example, a box 1112 may be presented to the user, and may include a request that the user provide an image for inclusion in the interactive image 1106. For example, the user may be prompted to take a picture of himself or herself using camera 1110, such as with a particular expression, or the like. The user may take the picture by pressing a particular location on the display 202, such as a virtual button (not shown). In the case of a virtual button, tactile output 1114 may be provided to the user's finger 1108 when the virtual button is pressed with sufficient force. Alternatively, the photograph may be taken using a mechanical control on the device 200. The image of the user may then be inserted into the box 1112 and further interacted with by the user, such as with variable tactile output as described herein. Furthermore, implementations herein are not limited to inserting pictures of a user into an e-book. For example, in some implementations the user may take a photograph of a map which appears on the display 202, and then a recognition function may be applied for providing variable tactile output when the user touches particular portions of the map, such as is described above with reference to FIGS. 2 and 5. As another example, a user may use the camera 110 to take an image of a crossword puzzle that is then displayed on the display 202 and further subject to variable tactile output and feedback when being viewed and manipulated by the user. Numerous other variations are possible with the foregoing being only several examples provided for discussion purposes.

Example Process

Figure 12:
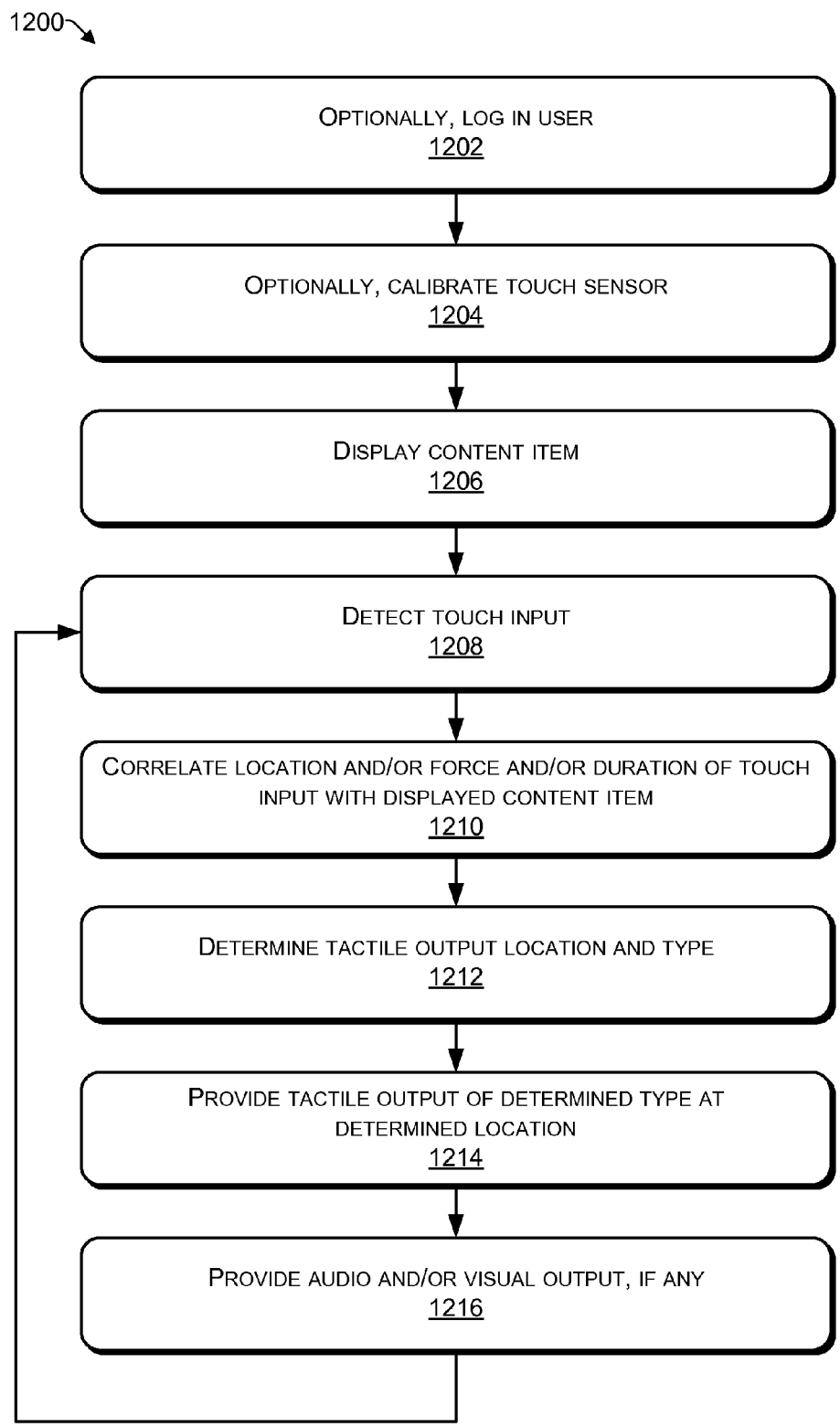
FIG. 12 is a flow diagram showing a process of outputting varying levels of tactile output in response to receiving a touch input.

FIG. 12 illustrates an example process 1200 for implementing the techniques described above of providing variable tactile output. This process is illustrated as a logical flow graph, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The process 1200 is described with reference to the electronic device 200 of FIGS. 2 and 3, although other devices, architectures and systems may implement this process.

At block 1202, optionally, a user may log in to the electronic device. For example, different users may use the electronic device, and each user may have his or her own account, device settings, saved content items, and the like. Thus, a user may save an interaction with the electronic device and resume the interaction later, after another user has used the electronic device.

At block 1204, optionally, a calibration procedure may be performed before a user begins to use the electronic device to calibrate the touch sensor to a particular user. For example, an adult may touch the electronic device using different levels of force than a child. Consequently, when different users use the electronic device, the electronic device may be calibrated to be sensitive to different force levels of touch inputs for each different user. For example, each user may have a different account or login for using the electronic device, and the electronic device may apply particular calibration settings for a particular user upon login to the electronic device. Furthermore, different users may take turns using the electronic device, such as when playing a game, and the calibration settings may be automatically switched when it becomes each player's turn to use the device, such as when the device is passed back and forth between two or more users.

At block 1206, a content item is displayed by the electronic device. For example, the content item may include an image, video, text, eBook, audio book, and so forth, rendered on a display of the device.

At block 1208, the electronic device detects a touch input. For example, a touch sensor may be associated with the display, and may detect a location of a touch input, such as made by a finger of a user touching the display. Furthermore, in addition to detecting the location of the touch input, in some implementations the touch sensor may also determine the amount of force of the touch input.

At block 1210, the location and/or force of the touch input is correlated with the displayed content item. For example, a content item may be authored, programmed, or otherwise have predetermined tactile output and other feedback responses specified to be provided or generated by the electronic device when a touch input is detected at the location of a particular feature of the content item rendered on the display. For example, the content item may include metadata associated therewith, such that when a first feature of the displayed image is touched, a first level of tactile output is delivered and when a second feature of the displayed image is touched, a second level of tactile output is delivered, and so on. Additionally other types of output may be specified for touch inputs detected for particular features of a displayed content item, such as sound feedback and/or visual feedback. Alternatively, in some implementations, the electronic device may include a recognition function that recognizes a particular type of image or particular features in an image, and provides a specified level of tactile output for touch inputs detected as touching particular locations on the particular image type.

At block 1212, the electronic device determines the tactile output location and level of intensity. For example, in some implementations, the tactile output may be delivered to a location at or near to where the user's finger is touching the display. Thus, some implementations provide localized tactile output of at a selected level of intensity out of multiple possible intensity levels.

At block 1214, localized tactile output may be provided at the determined level of intensity. For example, in some implementations, a vibration type of tactile output may be provided by one or more actuators, such as piezoelectric actuators located on the underside of the display of the electronic device. For example, a plurality of individually operable actuators may be mounted on the backside of the display for generating tactile output in the vicinity of the finger that is touching the display. For example, a single actuator nearest to the finger might be operated out of multiple actuators on the device. Additionally, in some implementations, rather than providing vibration or other mechanical output, electrical or electromagnetic output may be provided, such as a low-level current, or the like.

At block 12146, audio and/or visual output may also be provided in response to the touch input. For example, as described above, various sounds may be provided and/or the image of the content item may be changed, and so forth.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A device providing tactile interaction with content, the device comprising:
a processor;
memory coupled to the processor;
a topographic map stored in the memory, the topographic map having at least a first contour line representing a first continuous unitary elevation throughout the topographic map and at least a second contour line representing a second continuous unitary elevation throughout the topographic map, the second continuous unitary elevation being higher than the first continuous unitary elevation;
a touch-sensitive display communicatively coupled to the processor to detect touch inputs and to render an image of at least a portion of the topographic map, the image having at least the first contour line and the second contour line;
a tactile output component to generate a tactile output of a selected intensity; and
a feedback module, stored in the memory and executable on the processor to:
receive a first indication that the touch-sensitive display has detected a first touch input crossing over the first contour line;
select a first tactile output of a first intensity based at least in part on the first touch input crossing over the first contour line;
instruct the tactile output component to provide the first tactile output;
receive a second indication that the touch-sensitive display has detected a second touch input crossing over the second contour line;
select a second tactile output of a second intensity, different from the first intensity, based at least in part on the second touch input crossing over the second contour line;
instruct the tactile output component to provide the second tactile output;
wherein:
the first contour line represents a lower portion of land represented by the topographic map;
the second contour line represents a higher portion of the land represented by the topographic map;
the first intensity of the first tactile output is based, at least in part, on a first height of the land represented by the first contour line; and
the second intensity of the second tactile output is based, at least in part, on a second height of the land represented the second contour line.

2. The device as recited in claim 1, wherein the tactile output component provides localized vibration to an area of the touch-sensitive display as the tactile output.

3. A device comprising:
a processor;
memory coupled to the processor;
a touch-sensitive display communicatively coupled to the processor to display the content item and to detect touch inputs;
a content item stored in the memory, the content item specifying multiple different levels of tactile output to be generated in response to touch inputs; and
a feedback module, stored in the memory and executable on the processor to:
receive an indication that the touch-sensitive display has detected a touch input at a first location;
determine that the first location is associated with the content item; and
select a tactile output from the multiple different levels of tactile output, wherein the tactile output comprises an electrical stimulus detectable on a surface of the touch-sensitive display.

4. The device as recited in claim 3, further comprising a tactile output component to generate the tactile output selected from the multiple different levels of tactile output, the tactile output component being configured to generate the electrical stimulus at multiple levels of intensity.

5. The device as recited in claim 4, wherein the tactile output component comprises an electrically conductive grid on the surface of the touch-sensitive display.

6. The device as recited in claim 4, wherein the tactile output component is configured to generate a tactile output that is localized to the first location on the touch-sensitive display that has detected the touch input.

7. The device as recited in claim 3, wherein in response to detecting movement of the touch input from the first location to a second location, the feedback component is further executable on the processor to gradually and non-stepwise change an intensity of the tactile output from a first level of intensity to a second level of intensity.

8. The device as recited in claim 7, wherein the first location corresponds to a first contour of an image of the content item displayed on the touch-sensitive display and the second location corresponds to a second contour of the image.

9. The device as recited in claim 3, wherein the feedback component is further executable on the processor to generate one or more of an audio output or a visual output based at least in part on the touch input at the first location.

10. A method, under control of an electronic device configured with specific executable instructions and having a display, comprising:
receiving a first touch input by a first user at a first location corresponding to a first portion of a content item being output by the display, the first user associated with a first calibration setting;
receiving a second touch input by a second user at a second location, different from the first location and corresponding to a second portion of the content item, the second user associated with a second calibration setting;
generating a first localized tactile output to a first area of the display at least partly in response to the first touch input; and
generating a second localized tactile output to a second area of the display at least partly in response to the second touch input, the second localized tactile output different from the first localized tactile output, wherein the first calibration setting correspond to a first plurality of touch-input force levels and the second calibration setting correspond to a second plurality of touch-input force levels.

11. The method as recited in claim 10, further comprising generating a sound output concurrently with the first tactile output and the second tactile output, wherein as the first tactile output changes to the second tactile output, the sound output changes in at least one of pitch or volume.

12. The method as recited in claim 10, wherein:
the content item includes an image displayed on the display; and
different features displayed in the image have different levels of tactile output associated therewith, the different features including the first portion of the content item and the second portion of the content item.

13. The method as recited in claim 12, wherein the image includes a map having contour lines, wherein different contour lines have different levels of tactile output associated therewith.

14. The method as recited in claim 10, wherein:
the content item includes an image having identifiable foreground features and a background; and
the electronic device assigns a first level of tactile output to the identifiable foreground features and a second level of tactile output to the background.

15. The method as recited in claim 10, wherein:
the display provides a three-dimensional (3D) image of the content item; and
the first portion of the content item appears as a lower portion of the 3D image at the first location and the second portion of the content item appears as a higher portion of the image at the second location.

16. The method as recited in claim 10, further comprising measuring an amount force exerted by the first touch input and the second touch input on the display, wherein:
the second touch input comprises a lower or higher amount of force on the display; and
the second tactile output differs from the first tactile output based at least in part on detected differences between the amount of force exerted by the first touch input and the amount of force exerted by the second touch input.

17. The method as recited in claim 10, wherein the first location and the second location are determined by at least one of:
a conductive grid;
detected interference with an electromagnetic field;
detected sound;
detected light blockage;
detected Infrared radiation; or
a camera.

18. The method as recited in claim 10, wherein the electronic device further includes a camera, and further comprising converting an image from the camera into a content item for tactile interaction.

19. The method as recited in claim 10, wherein the first touch input made by the first user and the second touch input made by the second user are made contemporaneously.

20. The method as recited in claim 10, wherein the first touch input made by the first user and the second touch input made by the second user are made sequentially and the electronic device automatically switches from the first calibration setting to the second calibration setting when control of the electronic device is changed from the first user to the second user.

21. The method as recited in claim 10, wherein:
the content item includes an image having a plurality of separately defined areas, with each area being associated with a level of tactile output that is different from a level of tactile output associated with an adjacent area.

22. The device as recited in claim 1, wherein the feedback module is further configured to automatically recognize different elevations represented in the topographic map and to automatically assign varying levels of intensity of tactile output with contour lines in the topographic map based at least in part on automatically recognized differences in elevation.

23. The device as recited in claim 1, wherein the topographic map stored in memory includes metadata associating the first tactile output with the first contour line and associating the second tactile output with the second contour line.

* * * * *